(12) United States Patent
Kim et al.

(10) Patent No.: US 12,379,781 B2
(45) Date of Patent: Aug. 5, 2025

(54) ELECTRONIC DEVICE AND OPERATION METHOD OF ELECTRONIC DEVICE

(71) Applicant: SAMSUNG ELECTRONICS CO., LTD., Suwon-si (KR)

(72) Inventors: Chulkwi Kim, Suwon-si (KR); Jeongwon Park, Suwon-si (KR); Younsang Yoo, Suwon-si (KR); Jongmin Yoon, Suwon-si (KR); Chanmin Park, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/117,220

(22) Filed: Mar. 3, 2023

(65) Prior Publication Data

US 2023/0205319 A1 Jun. 29, 2023

Related U.S. Application Data

(63) Continuation of application No. PCT/KR2021/011164, filed on Aug. 23, 2021.

(30) Foreign Application Priority Data

Sep. 3, 2020 (KR) .......... 10-2020-0112247

(51) Int. Cl.
*G06T 11/00* (2006.01)
*G06F 3/01* (2006.01)
(52) U.S. Cl.
CPC .............. *G06F 3/016* (2013.01); *G06T 11/00* (2013.01)
(58) Field of Classification Search
CPC .......... G06F 3/011; G06F 3/016; G06T 19/00; G06T 11/00; G02B 27/01
(Continued)

(56) References Cited

U.S. PATENT DOCUMENTS 9,367,136 B2 6/2016 Latta et al.
9,524,580 B2 12/2016 Katz et al.
(Continued)

FOREIGN PATENT DOCUMENTS

JP 2020-21225 A 2/2020
JP 6783541 B2 10/2020
(Continued)

OTHER PUBLICATIONS

Kerruish, Erika. "Arranging sensations: smell and taste in augmented and virtual reality." The Senses and Society 14.1 (2019): 31-45.*

(Continued)

*Primary Examiner* — Phu K Nguyen
(74) *Attorney, Agent, or Firm* — Sughrue Mion, PLLC

(57) ABSTRACT

An electronic device according to an embodiment disclosed in the present document may include: a display; at least one sensor; a communication circuit; a memory; and a processor coupled to the display, the at least one sensor, the communication circuit, and the memory, wherein the memory includes instructions which, when executed, cause the processor to: provide an augmented reality (AR) environment; recognize a transition property of a real object through the at least one sensor; recognize a property of a virtual object in the augmented reality environment; and assign at least a part of the transition property of the real object to the virtual object on the basis of the transition property of the real object and the property of the virtual object.

20 Claims, 10 Drawing Sheets

(58) Field of Classification Search
USPC .......................................................... 345/418
See application file for complete search history.

(56) References Cited

U.S. PATENT DOCUMENTS

| | | | |
|---|---|---|---|
| 10,001,834 | B2 | 6/2018 | Katz et al. |
| 10,713,001 | B2 | 7/2020 | Tamaoki et al. |
| 11,776,206 | B1 * | 10/2023 | Gupta ..................... G06T 17/05 |
| | | | 345/419 |
| 2014/0176607 | A1 | 6/2014 | Yang et al. |
| 2016/0086381 | A1 | 3/2016 | Jung et al. |
| 2017/0213473 | A1 * | 7/2017 | Ribeira ................... G06T 19/00 |
| 2019/0391647 | A1 | 12/2019 | Rhin et al. |
| 2020/0074725 | A1 * | 3/2020 | Skidmore ............. G06T 19/006 |
| 2021/0110614 | A1 * | 4/2021 | Shahrokni ............... G06T 15/00 |
| 2021/0256766 | A1 * | 8/2021 | Muhlethaler ............ G06F 3/012 |
| 2021/0279953 | A1 * | 9/2021 | Bouhnik .................. G06T 7/55 |
| 2022/0301269 | A1 * | 9/2022 | Miller .................... G06V 20/20 |
| 2022/0413294 | A1 * | 12/2022 | Hsiao ................ G02B 27/0172 |
| 2024/0169603 | A1 * | 5/2024 | Moon ..................... G06T 11/00 |

FOREIGN PATENT DOCUMENTS

| | | | |
|---|---|---|---|
| KR | 10-2014-0051046 A | | 4/2014 |
| KR | 10-2014-0082266 A | | 7/2014 |
| KR | 20140082266 | * | 7/2014 |
| KR | 10-2015-0057424 A | | 5/2015 |
| KR | 10-2016-0105796 A | | 9/2016 |
| KR | 20160105796 | * | 9/2016 |
| KR | 10-1832556 B1 | | 2/2018 |
| KR | 10-2018-0048206 A | | 5/2018 |
| KR | 10-2018-0062011 A | | 6/2018 |
| KR | 10-1941158 B1 | | 4/2019 |
| KR | 10-1986608 B1 | | 6/2019 |
| KR | 10-2309454 B1 | | 10/2021 |
| KR | 10-2414587 B1 | | 6/2022 |

OTHER PUBLICATIONS

International Search Report (PCT/ISA/210) dated Dec. 28, 2021 issued by the International Searching Authority in International Application No. PCT/KR2021/011164.

Written Opinion (PCT/ISA/237) dated Dec. 28, 2021 issued by the International Searching Authority in International Application No. PCT/KR2021/011164.

* cited by examiner

ELECTRONIC DEVICE AND OPERATION METHOD OF ELECTRONIC DEVICE

CROSS REFERENCES TO RELATED APPLICATIONS

The present application is a bypass continuation of International Application No. PCT/KR2021/011164, filed on Aug. 23, 2021, in the Korean Intellectual Property Office, which claims priority from Korean Patent Application No. 10-2020-0112247, filed on Sep. 3, 2020, in the Korean Intellectual Property Office, the disclosures of which are incorporated herein in their entireties.

TECHNICAL FIELD

The disclosure relates to an electronic device providing an augmented reality (AR) environment and an operation method of the electronic device.

BACKGROUND

As electronic technology develops, various types of electronic devices are being developed and spread. In particular, portable devices that can take photographs, such as smart phones, tablet PCs, and wearable devices, are being developed. Devices providing an augmented reality environment or a virtual reality environment are becoming popular as the performance of the devices develops. For example, recently, devices (e.g., HMD devices) worn on a user's body are also widely used.

Augmented reality may be a technology that provides a virtual three-dimensional object with real objects (i.e., real objects) as one environment, and virtual reality may be a technology that provides a virtual environment similar to reality with virtual objects.

However, when electronic devices provide a virtual reality environment or an augmented reality environment, a technology for visually and audibly providing a real object or a virtual object is used, but it is difficult to provide an environment similar to reality with only visual sense and auditory sense. Therefore, to provide a more realistic augmented reality environment or virtual reality environment, a technique for providing feedback with regard to the user's other senses (e.g., tactile sense or olfactory sense) is required.

SUMMARY

Embodiments disclosed in the disclosure are intended to provide an electronic device and an operating method of the electronic device that provide a realistic and immersive augmented reality or virtual reality environments.

According to an embodiment disclosed in the disclosure, an electronic device includes a display, at least one sensor, a communication circuit, a memory, and a processor operatively connected with the display, the at least one sensor, the communication circuitry, and the memory, and the memory storing instructions that, when executed, cause the processor to provide an augmented reality (AR) environment, to recognize a transition property of a real object through the at least one sensor, to recognize a property of a virtual object in the augmented reality environment, and to assign at least some of the transition property of the real object to the virtual object based on the transition property of the real object and the property of the virtual object.

According to an embodiment disclosed in the disclosure, an operating method of an electronic device includes providing an augmented reality (AR) environment, recognizing a transition property of a real object through the at least one sensor, recognizing a property of a virtual object in the augmented reality environment, and assigning at least some of the transition property of the real object to the virtual object based on the transition property of the real object and the property of the virtual object.

According to an embodiment disclosed in the disclosure, a non-transitory recording medium storing computer-readable instructions that, when executed by an electronic device, cause the electronic device to provide an augmented reality (AR) environment, recognize a transition property of a real object through the at least one sensor, recognize a property of a virtual object in the augmented reality environment, and assigning at least some of the transition property of the real object to the virtual object based on the transition property of the real object and the property of the virtual object.

According to the embodiments disclosed in the disclosure, it is possible to implement a realistic virtual object by assigning some of the property of a real obj ect to a virtual object.

According to the embodiments disclosed in the disclosure, realistic tactile or olfactory feedbacks may be provided for a virtual object.

According to the embodiments disclosed in the disclosure, a more realistic augmented reality environment or virtual reality environment may be provided by assigning some of the property of a real object to a virtual object.

In addition to this, various effects identified directly or indirectly through this specification may be provided.

BRIEF DESCRIPTION OF DRAWINGS

In connection with the description of the drawings, the same or similar reference numerals may be used for the same or similar components.

DETAILED DESCRIPTION

Figure 1:
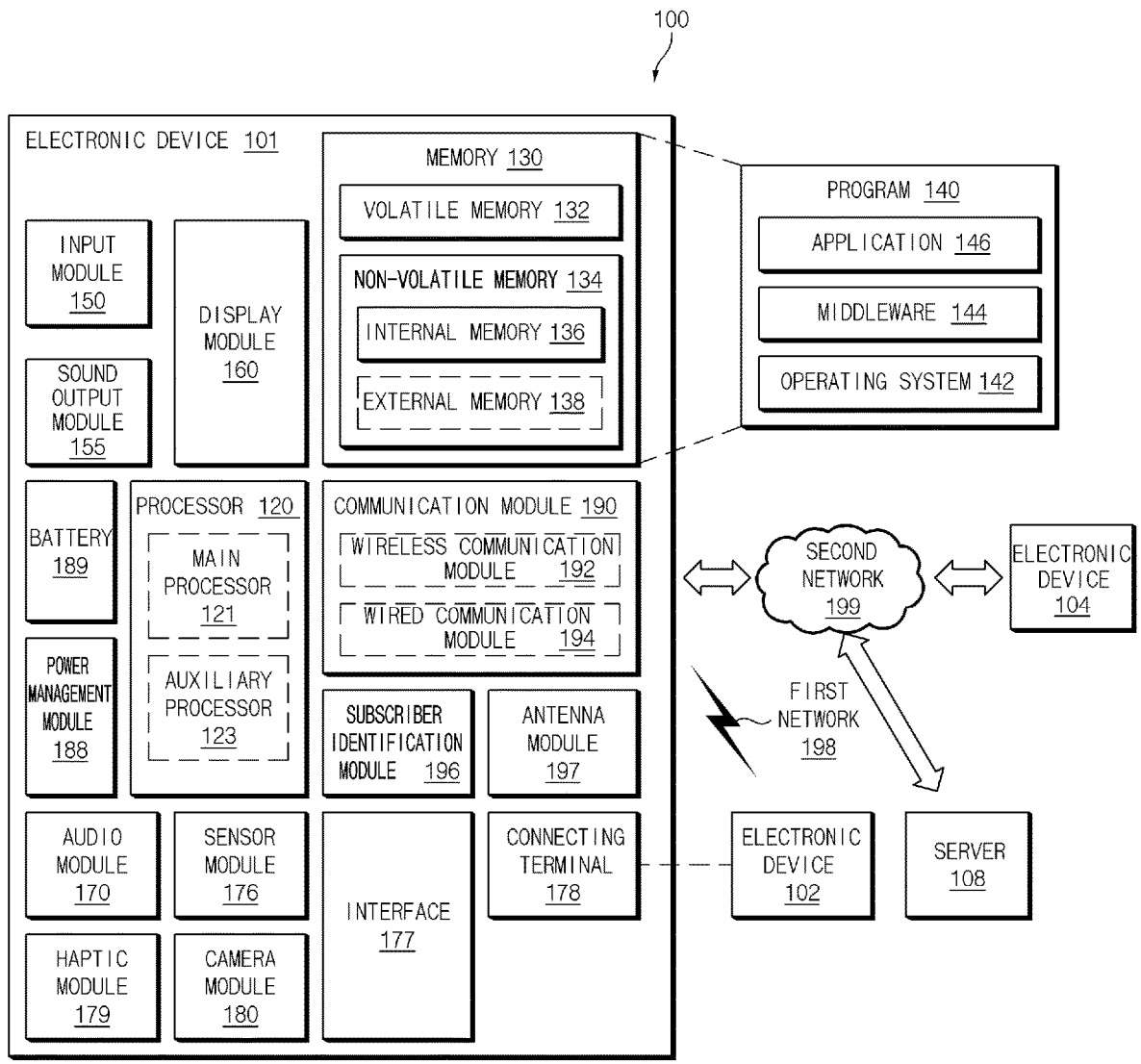
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
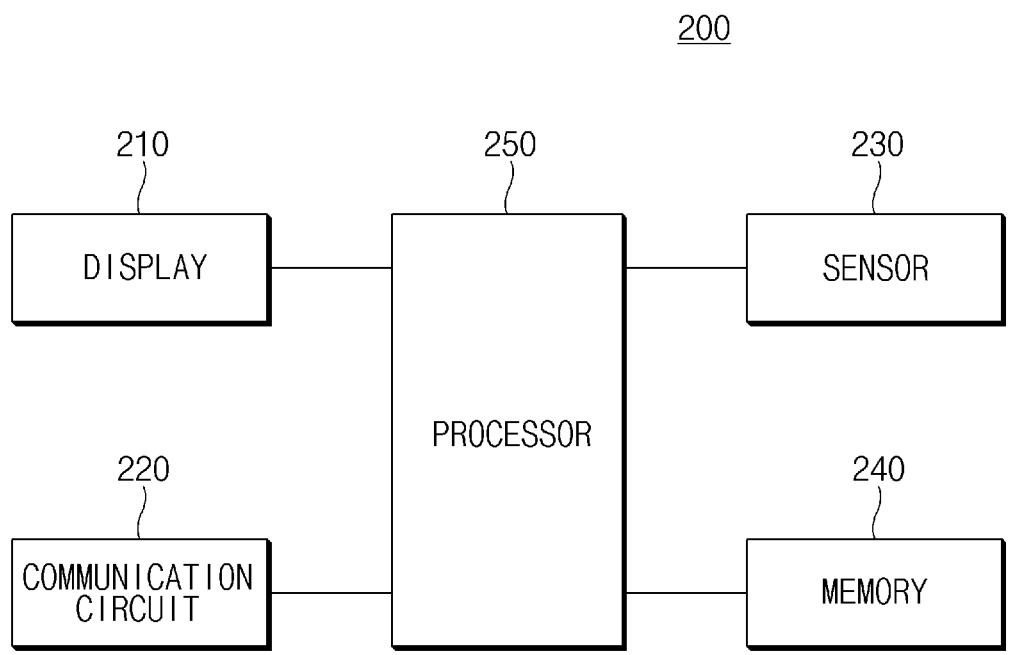
FIG. 2 is a block diagram of an electronic device according to an embodiment.

FIG. 2 is a block diagram of an electronic device according to an embodiment.

According to an embodiment, an electronic device 200 (e.g., the electronic device 101 of FIG. 1) may include a display 210 (e.g., the display module 160 of FIG. 1), a communication circuit 220 (e.g., the communication module 190 of FIG. 1), an at least one sensor 230 (e.g., the sensor module 176 of FIG. 1), a memory 240 (e.g., the memory 130 of FIG. 1), and a processor 250 (e.g., the processor 120 of FIG. 1). According to various embodiments, the electronic device 200 may further include at least some of the components of the electronic device 101 illustrated in FIG. 1.

According to an embodiment, the display 210 may display various contents. According to an embodiment, the display 210 may provide an augmented reality (AR) environment and/or a virtual reality (VR) environment. For example, the display 210 may display a real object and a virtual object in the augmented reality environment.

According to an embodiment, the communication circuit 220 may transmit and receive data and/or signals of the external electronic device 200. For example, the communication circuit 220 may receive data related to a transition property of a real object and/or a property of a virtual object from the external electronic device 200 (e.g., a server or a cloud). For example, the communication circuit 220 may transmit a command for controlling the external electronic device 200 (e.g., a feedback device) to the external electronic device 200.

According to an embodiment, the at least one sensor 230 may recognize a real object or may obtain external environmental information. According to an embodiment, the at least one sensor 230 may include at least one of a temperature sensor (e.g., an infrared sensor), an image sensor (e.g., a camera), an olfactory sensor, and one or more microphones. For example, the at least one sensor 230 may measure the temperature of the real object or may measure the scent and concentration of the real object. For example, the sensor 230 (e.g., one or more microphones) may obtain external environmental information (e.g., wind direction and wind speed). According to an embodiment, the at least one sensor 230 may include at least a portion of the sensor module 176 of FIG. 1.

According to an embodiment, the memory 240 may store instructions executed by processor 250. According to an embodiment, the memory 240 may store transition property of the real object and/or property of the virtual object.

According to an embodiment, the processor 250 may provide an augmented reality (AR) environment and/or a virtual reality (VR) environment. For example, the processor 250 may provide a real object and a virtual object together in an augmented reality environment.

According to an embodiment, the processor 250 may recognize a real object through at least one sensor 230. For example, the processor 250 may recognize a real object through the image sensor (e.g., a camera). For example, the processor 250 may recognize the type, material, and/or size of a real object by analyzing an image obtained through the image sensor. According to an embodiment, the processor 250 may recognize transition property of a real object through the at least one sensor 230. For example, the transition property may include a temperature (heat) or a scent. According to an embodiment, the processor 250 may determine (or measure) a parameter related to a transition property of a real object. For example, the processor 250 may determine the temperature value of the real object, the size of the real object, the type of scent of the real object, the concentration of scent of the real object, and/or the material of the real object, by using the at least one sensor 230. For example, the processor 250 may measure the size of a real object using a 3D depth sensor or an image sensor (e.g., an RGB sensor), or may measure the maximum temperature (or temperature range) of a real object through the temperature sensor (e.g., a thermal image cam or an infrared sensor). For example, the processor 250 may measure the type or concentration of scent (smell) of a real object through an olfactory sensor.

According to an embodiment, the processor 250 may recognize property of the virtual object. For example, the processor 250 may recognize a predefined property of a virtual object disposed in an augmented reality environment. According to an embodiment, the property of the virtual object may be defined by a user input. According to an embodiment, the processor 250 may receive a predefined property of a virtual object from the external electronic device 200 (e.g., a database, server, or cloud). For example, the property of the virtual object may include at least one of material, size, temperature, scent, type, state, and duration of the virtual object. For example, the duration may be a time during which a virtual object is provided (placed) in an augmented reality environment.

According to an embodiment, the processor 250 may assign at least some of the transition property of the real object to the virtual object. For example, the processor 250 may assign a temperature (heat) to the virtual object based on the temperature (heat) of the real object. For example, the processor 250 may assign a scent to the virtual object based on the scent of the real object.

According to an embodiment, the processor 250 may assign at least some of the transition property of the real object to the virtual object based on the transition property of the real object and the property of the virtual object. For example, the processor 250 may determine the temperature (heat) and/or the concentration of scent to be assigned to the virtual object, based on the size or material of the real object, and/or the size, material (thermal conductivity according to the material), or duration (retention time) of the virtual object.

According to an embodiment, the processor 250 may assign at least some of the property of the real object to the virtual object based on the distance between the real object and the virtual object in the augmented reality environment. For example, the processor 250 may determine a value of a transition property to be assigned to the virtual object based on the distance between the real object and the virtual object. For example, the processor 250 may determine an estimated temperature (heat) or an estimated scent (scent concentration) to be assigned to the virtual object based on the distance from the real object. According to an embodiment, the processor 250 may determine a value of the transition property to be assigned to the virtual object based on a law (e.g., Graham's law of diffusion) or a formula (e.g., a heat transfer (conduction, convection, or radiation) formula) related to the transition property. For example, the processor 250 may use existing laws or formulas related to transition property as they are, or may modify and use the laws or the formulas to be suitable for the augmented reality environment. For example, the processor 250 may determine a value of the transition property to be assigned to the virtual object based on an equation defined by a user. For example, the processor 250 uses an approximation of a law or formula related to the transition property, or simplifies and uses a law or formula related to the transition property, so that the processor 250 may reduce performance limits of the processor, limits of an environmental sensing information, or limits of recognition performance. For example, when a real object is fire, the processor 250 may assign a higher temperature (heat) property to the virtual object as the virtual object exists in a location closer to the real object in the augmented reality environment. For example, when a real object has a scent, the processor 250 may assign a scent property with a higher concentration to the virtual object as the virtual object exists closer to the real object in the augmented reality environment.

According to an embodiment, the processor 250 may adjust a value of the property assigned to a virtual object over time. For example, the processor 250 may adjust the value of the property assigned to a virtual object based on the duration of the real object or the virtual object. For example, when a real object has heat (temperature) or scent, the processor 250 may adjust the temperature or the scent concentration of the virtual object according to the duration of the real object and the duration of the virtual object around the real object. For example, when a virtual object (e.g., an unscented handkerchief) is disposed around a real object having a specific scent in the augmented reality environment, the scent (scent concentration) transferred to the virtual object may increase over time. For example, when a virtual object is disposed around a real object (e.g., fire) that generates heat in the augmented reality environment, the amount of heat (temperature) transferred to the virtual object may increase over time. As another example, when the virtual object moves away from the real object (i.e., when there is no transition property (e.g., temperature or scent) that transitions from the real object), the processor 250 may decrease the value of the transition property assigned to the virtual object over time.

According to an embodiment, the processor 250 may obtain external environment information of the electronic device 200 through the at least one sensor 230, and may assign at least some of the property of the real object to the virtual object based on at least some of the environment information. For example, the environmental information may include at least one of wind direction, wind speed, temperature, humidity, and weather. For example, the electronic device 200 may determine a value (e.g., a temperature and/or concentration of a scent to be assigned to the virtual object) that assigns the transition property (e.g., temperature or scent) of the real object to the virtual object, based on whether the wind blows from the real object direction to the virtual object direction or from the virtual object direction to the real object direction, or based on wind speed.

According to an embodiment, the processor 250 may assign at least some of property assigned to a virtual object to other virtual objects. For example, when a first virtual object exists around a real object and a second virtual object exists around the first virtual object, the processor 250 may assign at least some of the transition property of the real object to the first virtual object, and may assign at least some of the transition property (transition property provided from the real object) of the first virtual object to the second virtual object. According to an embodiment, when property (transition property) of the virtual object are predefined, the processor 250 may cause at least some property to be transferred between virtual objects provided in the virtual reality environment as well as the augmented reality environment.

According to an embodiment, the processor 250 may store at least one of information about the transition property of a real object and information about the property of a virtual object into at least one of the memory 240 and the external electronic device 200 (e.g., a database, a server, and/or cloud). For example, the stored information may be later utilized when the electronic device 200 assigns a specific property to a virtual object in the augmented reality environment or the virtual reality environment.

According to an embodiment, the processor 250 may allow at least one feedback device that provides a tactile feedback or an olfactory feedback to the user based on property assigned to the virtual object to provide the tactile feedback or the olfactory feedback to the user. For example, the feedback device may be a device configured to be worn on a part of the user's body (e.g., a glove, belt, garment, or shoe). For example, the feedback device may include a heating unit or an electrical output unit for providing the tactile feedback to the user, or may include a scent output unit for providing the olfactory feedback to the user. For example, the processor 250 may transmit a property assigned to a virtual object and data (e.g., a temperature value, a scent concentration value, and/or a type of scent) related to the property or a control signal that causes a specific feedback to be performed to a feedback device. For example, the feedback device may output a feedback corresponding to property assigned to the virtual object based on data and/or signals received from the electronic device 200.

The electronic device 200 according to various embodiments may provide realistic and immersive augmented reality or virtual reality environments to the user by providing a feedback from various senses including not only a visual sense and an auditory sense but also an olfactory sense and a tactile sense, similar to a real world with respect to virtual objects in the augmented reality environment or virtual reality environment.

Figure 3A:
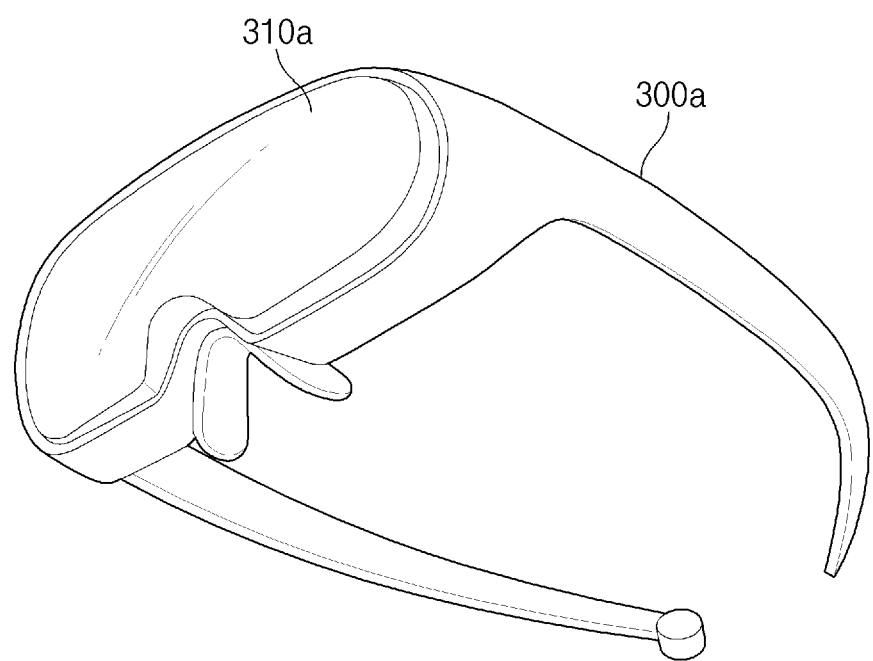
FIGS. 3A and 3B illustrate examples of an electronic device and a feedback device according to an embodiment.
Figure 3B:
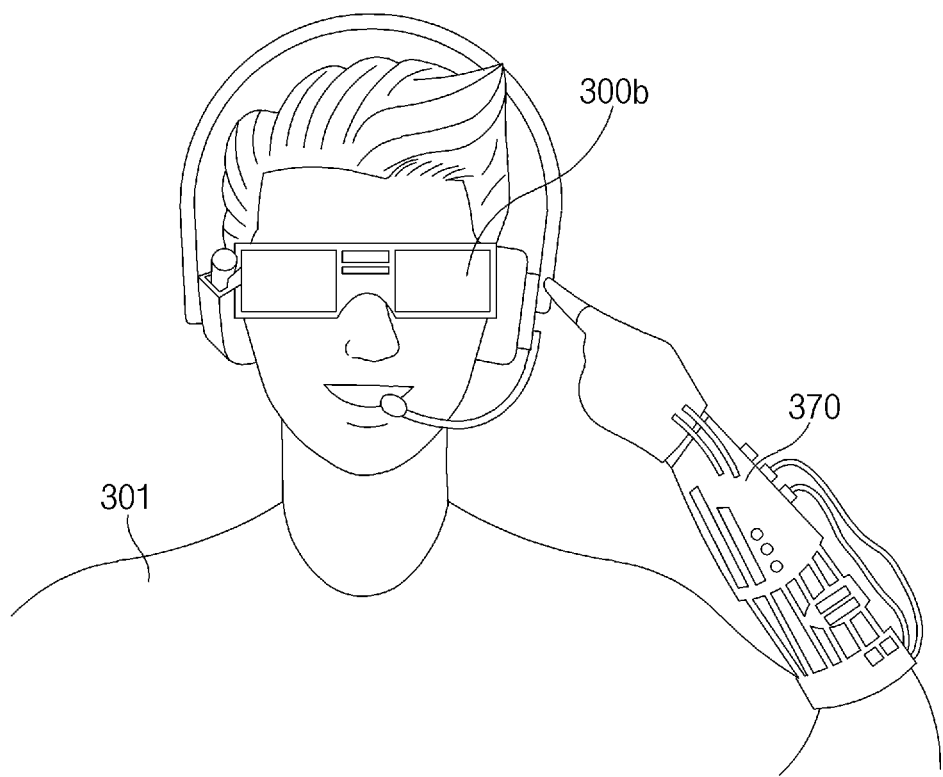

FIGS. 3A and 3B illustrate examples of an electronic device and a feedback device according to an embodiment.

For example, FIG. 3A illustrates an electronic device 300a (e.g., the electronic device 100 of FIG. 1 or the electronic device 200 of FIG. 2) according to an embodiment. For example, the electronic device 300a may be a wearable device (e.g., a head mounted display (HMD) device) that can be worn on a part of the user's body. For example, the electronic device 300a may include a housing configured to be worn on a part of a user's body. According to an embodiment, the electronic device 300a may provide an augmented reality environment and/or a virtual reality environment to a user wearing the electronic device 300a through a display 310a.

Referring to FIG. 3B, a user 301 may wear an electronic device 300b (e.g., the electronic device 100 of FIG. 1 or the electronic device 200 of FIG. 2) and a feedback device 370 (e.g., the electronic device 102 and 104 of FIG. 1) together. For example, the electronic device 300b may be an HMD device worn on the head of the user 301, and the feedback device 370 may be a glove worn on the hand of the user 301. For example, the electronic device 300b and the feedback device 370 may transmit and receive data and/or signals to each other through communication. For example, the electronic device 300b may transmit a signal for controlling the feedback device 370 to the feedback device 370. For example, the electronic device 300b may transmit a signal for controlling the feedback device 370 based on the assigned property of a virtual object. For example, the electronic device 300b may recognize the transition property of the real object and may assign at least some of the transition property of the real object to the virtual object. For example, the electronic device 300b may output feedback corresponding to a property assigned by the feedback device 370 based on the property assigned to the virtual object. For example, the electronic device 300b may transmit data on property assigned to the virtual object to the feedback device 370, or may transmit a signal (e.g., command) to provide feedback corresponding to property assigned to the virtual object to the feedback device 370.

According to an embodiment, the feedback device 370 may include components for providing the tactile feedback and/or the olfactory feedback to the user 301. For example, the feedback device 370 may include a heating unit generating heat at a set temperature, a scent output unit outputting a set scent (smell), and/or an output unit outputting a set electrical feedback. According to an embodiment, the feedback device 370 may output feedback corresponding to the property of the virtual object based on the property of the virtual object received from the electronic device 300b. For example, the feedback device 370 may generate heat having a temperature corresponding to the temperature property of the virtual object or output a scent corresponding to the scent property of the virtual object at a designated concentration.

According to an embodiment, the electronic device 300a or 300b may output feedback corresponding to the property of the virtual object based on the property assigned to the virtual object. For example, the electronic device 300a or 300b themselves may operate as the feedback device without using an external feedback device 370. For example, the electronic device 300a or 300b may include components for providing tactile feedback and/or olfactory feedback to the user 301. For example, the electronic devices 300a and 300b may include a scent output unit that outputs a set scent (smell). For example, the electronic device 300a or 300b may output scent corresponding to the scent property of the virtual object at a designated concentration through the scent output unit.

According to various embodiments, the electronic device 300a or 300b and/or the feedback device 370 provide the feedback corresponding to property of the virtual object, so that the user 301 may realistically and immersively perceive the virtual object in the augmented reality environment or the virtual reality environment.

Figure 4A:
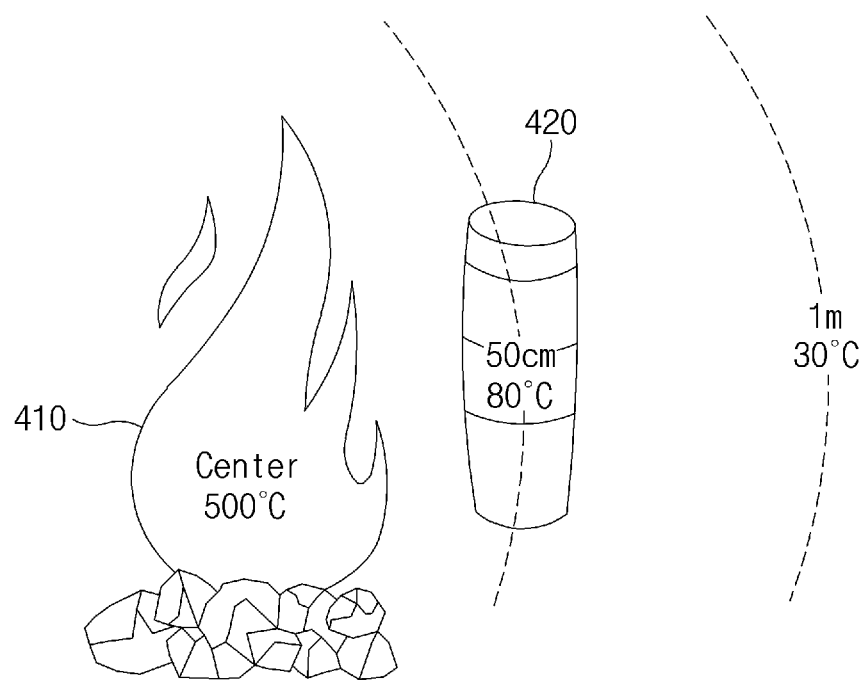
FIGS. 4A and 4B are diagrams for describing an operation of an electronic device according to an embodiment.
Figure 4B:
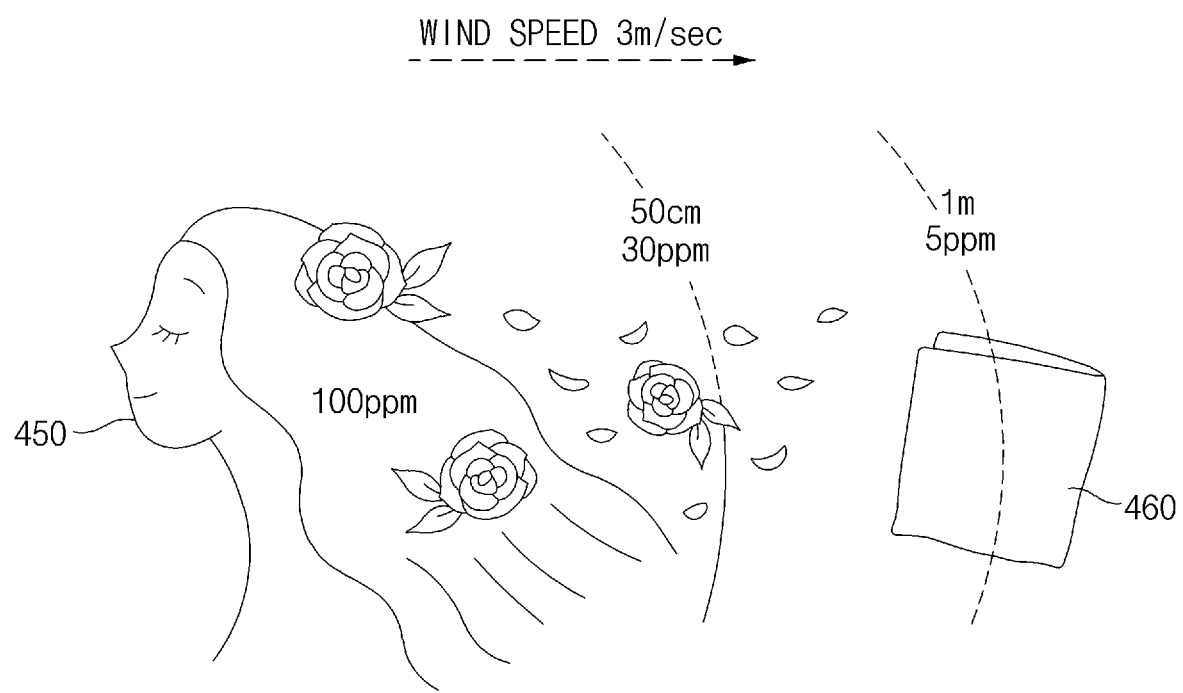

FIGS. 4A and 4B are diagrams for describing an operation of an electronic device according to an embodiment.

According to an embodiment, an electronic device may recognize the transition property of real objects 410 and 450 and the property of the virtual objects 420 and 460, and may assign at least some of the transition property of the real objects 410 and 450 to the virtual objects 420 and 460.

Referring to FIG. 4A, it is assumed that a real object is a bonfire 410 and a virtual object is a thermos bottle 420. For example, the electronic device may recognize the real object (bonfire) 410 through a sensor (e.g., a camera). According to an embodiment, the electronic device may recognize the transition property of the real object 410. For example, the electronic device may recognize the temperature (heat) of the bonfire 410. According to an embodiment, the electronic device may determine a parameter related to the transition property of the real object 410. For example, the electronic device may determine (or measure) the size of the bonfire 410, the material (e.g., coal) of the bonfire 410, and the temperature (e.g., 500° C.) of the bonfire 410. According to an embodiment, the electronic device may recognize the property of the virtual object (thermos bottle) 420. For example, the electronic device may recognize the temperature, material, thermal conductivity, and/or size of the thermos bottle 420. According to an embodiment, the property of the virtual object 420 may be designated by a user or may be set in advance. According to an embodiment, the electronic device may assign the transition property (e.g., temperature (heat)) of the real object 410 to the virtual object 420. For example, the electronic device may transfer the temperature (heat) of the bonfire 410 to the temperature (heat) of the virtual object 420 disposed around it. For example, the electronic device may assign the temperature (heat) property to the virtual object 420 such that the virtual object 420 receives heat from the real object 410 and then the effect of becoming hot appears. According to an embodiment, the electronic device may assign at least some of the transition property of the real object 410 to the virtual object 420 based on the distance between the real object 410 and the virtual object 420 in the augmented reality environment. For example, when the bonfire 410 and the thermos bottle 420 are 50 cm apart and the bonfire 410 and the thermos bottle 420 are lm away, a degree to which the temperature (heat) of the bonfire 410 is transferred to the thermos bottle 420 may be different. For example, the electronic device may differently determine the degree to which the temperature (heat) of the bonfire 410 is transferred to the thermos bottle 420 based on the distance between the bonfire (real object) 410 and the thermos bottle (virtual object) 420 in the augmented reality environment. For example, as illustrated in FIG. 4A, when the temperature of the bonfire 410 is 500° C. and the bonfire 410 and the thermos bottle 420 are 50 cm apart, the electronic device may assign a temperature (heat) of 80° C. to the thermos bottle 420, and when the temperature of the bonfire 410 is 500° C. and the bonfire 410 and the thermos bottle 420 are lm apart, the electronic device may assign a temperature (heat) of 30° C. to the thermos bottle 420. According to various embodiments, the electronic device may determine a temperature value to be assigned to the virtual object 420 based on not only the distance between the virtual object 420 and the real object 410, but also parameters (e.g., the size, material, and/or a temperature of the real object 410) related to transition property of the real object 410 and/or various property (e.g., material, size, and/or existing temperature) of the virtual object 420.

Referring to FIG. 4B, it is assumed that a real object is a person (hair of a person) 450 and the virtual object is the handkerchief 460. For example, the electronic device may recognize a real object (e.g., a person's hair) 450 through a sensor. According to an embodiment, the electronic device may recognize the transition property of the real object 450. For example, the electronic device may recognize the scent (or smell) of the hair 450 through a sensor (e.g., an olfactory sensor). According to an embodiment, the electronic device may determine (or measure) a parameter related to the transition property of the real object 450. For example, the electronic device may determine the type (e.g., floral scent) of the scent (smell) and/or concentration (e.g., 100 ppm) of the scent (smell). According to an embodiment, the electronic device may recognize the property of the virtual object (handkerchief 460). For example, the electronic device may recognize the scent, material, and/or size of the handkerchief 460. According to an embodiment, the electronic device may assign the transition property (e.g., scent) of the real object 450 to the virtual object 460. For example, the electronic device may transfer the scent of the person's hair 450 to the handkerchief 460 disposed around it. For example, a scent property may be assigned to the virtual object 460 such that an effect in which scent is transferred to the virtual object 460 by the real object 450 appears. According to an embodiment, the electronic device may assign at least some of the transition property of the real object 450 to the virtual object 460 based on the distance between the real object 450 and the virtual object 460 in the augmented reality environment. For example, when the hair 450 and the handkerchief 460 are at a distance of 50 cm and the hair 450 and the handkerchief 460 are at a distance of 1m, the degree to which the scent of the hair 450 is transferred to the handkerchief 460 may be different. For example, the electronic device may differently determine the degree to which the scent of the hair 450 is transferred to the handkerchief 460 based on the distance between the hair (real object) 450 and the handkerchief 460 (virtual object) in the augmented reality environment. For example, as illustrated in FIG. 4B, when the scent concentration of the hair is 100 ppm and the hair and the handkerchief 460 are at a distance of 50 cm, the electronic device may assign a scent of 30 ppm concentration to the handkerchief 460, and when the scent concentration of the hair is 100 ppm and the hair 450 and the handkerchief 460 are at a distance of 1m, the electronic device may assign a scent of 5 ppm to the handkerchief 460. According to various embodiments, the electronic device may determine the value (e.g., concentration) of the scent assigned to the virtual object 460 based on not only the distance between the virtual object 460 and the real object 450, but also various property (e.g., material, size, existing scent and/or concentration) of the virtual object 460.

According to an embodiment, the electronic device may assign the transition property of the real object 410 or 450 to the virtual object based on external environment information (e.g., wind direction and/or wind speed). For example, in providing an effect in which temperature or scent is transferred from the real object 410 or 450 to the virtual object, the electronic device may differently determine the value of the transition property assigned to the virtual object based on the direction or speed of wind. For example, in FIG. 4A, the electronic device may determine whether to increase or decrease heat transfer from the real object (bonfire) 410 to the virtual object (thermos) 420 based on wind direction or wind speed, and in FIG. 4B, the electronic device may determine whether to increase or decrease the transmission of scent from the real object (hair) 450 to the virtual object (handkerchief) 460 based on the wind direction (e.g., the direction of the virtual object (handkerchief)) and the wind speed.

An electronic device according to an embodiment may include a display, at least one sensor, a communication circuit, a memory, and a processor operatively connected with the display, the at least one sensor, the communication circuit, and the memory.

According to an embodiment, the memory stores instructions that, when executed, cause the processor to provide an augmented reality (AR) environment, to recognize transition property of a real object through the at least one sensor, to recognize property of a virtual object in the augmented reality environment, and to assign at least some of the transition property of the real object to the virtual object, based on the transition property of the real object and the property of the virtual object.

According to an embodiment, the transition property of the real object may include a temperature or a scent of the real object.

According to an embodiment, the property of the virtual object may include at least one of a material, a size, a temperature, a scent, a type, a state, and a duration of the virtual object.

According to an embodiment, the instructions may cause the processor to assign at least some of property of the real object to the virtual object, based on a distance between the real object and the virtual object in the augmented reality environment.

According to an embodiment, the instructions may cause the processor to obtain external environment information of the electronic device through the at least one sensor, and to assign at least some of the property of the real object to the virtual object, based on at least some of the environment information.

According to an embodiment, the instructions may cause the processor to provide a tactile feedback or an olfactory feedback to a user through at least one feedback device configured to provide the tactile feedback or the olfactory feedback to the user based on the property assigned to the virtual object.

According to an embodiment, the instructions may cause the processor adjust a property value assigned to the virtual object over time.

According to an embodiment, the instructions may cause the processor to assign at least some of the property assigned to the virtual object to another virtual object.

According to an embodiment, the instructions may cause the processor to store at least one of information about the transition property of the real object and information about the property of the virtual object in at least one of the memory and an external database of the electronic device.

According to an embodiment, the at least one sensor may include at least one of a temperature sensor, an image sensor, an olfactory sensor, and one or more microphones.

Figure 5:
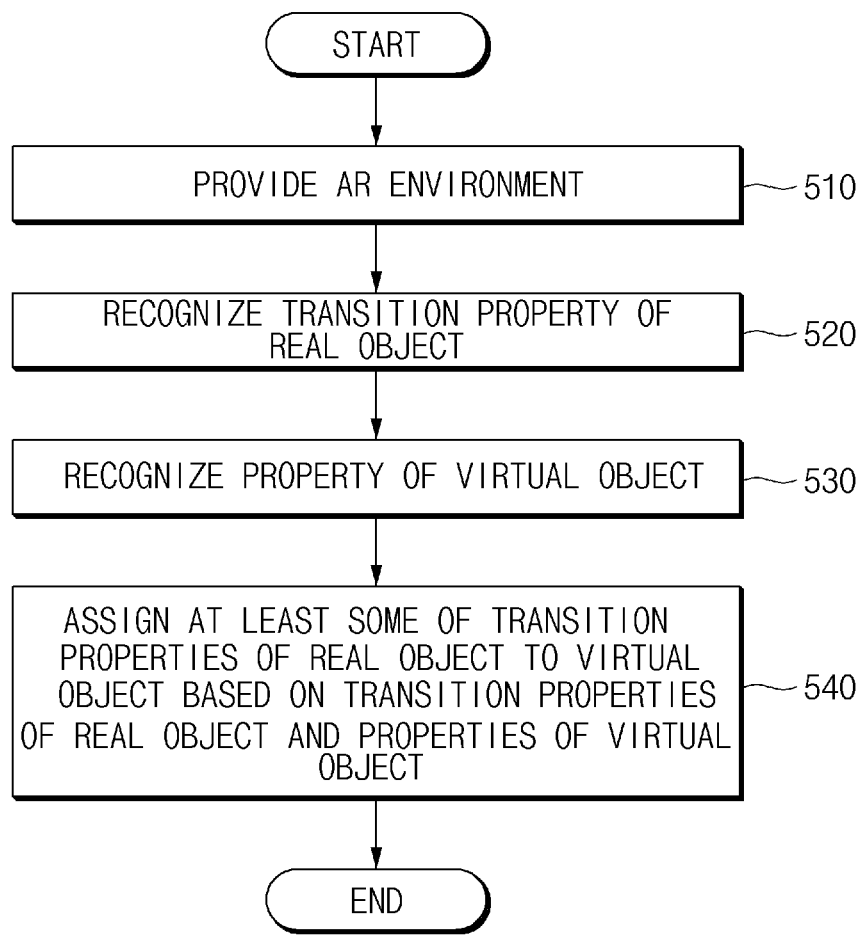
FIG. 5 is a flowchart of an operation method of an electronic device according to an embodiment.

FIG. 5 is a flowchart of an operation method of an electronic device according to an embodiment.

According to an embodiment, in operation 510, the electronic device (e.g., the electronic device 101 of FIG. 1, the electronic device 200 of FIG. 2, and the electronic devices 300*a* and 300*b* of FIGS. 3A and 3B) may provide an augmented reality (AR) environment. For example, the electronic device may output both a real object and a virtual object through a display.

According to an embodiment, in operation 520, the electronic device may recognize the transition property of the real object. For example, an electronic device may recognize a real object through an image sensor (e.g., a camera). For example, the electronic device may recognize the type, material, and/or size of a real object by analyzing an image acquired through an image sensor. For example, when recognizing a real object, the electronic device may recognize a transition property of the real object. For example, the transition property of the real object may include the temperature or scent of the real object. For example, when the real object is a bonfire, the transition property of the real object may include temperature (i.e., heat). For example, when the real object is an object having a scent or smell, the transition property of the real object may include the scent or smell. According to an embodiment, the electronic device may determine a parameter related to a transition property of the real object. For example, when the real object is a bonfire, the electronic device may measure at least one of the material of the bonfire (e.g., coal), the size of the flame, the maximum temperature, the size (e.g., the size of the firewood), or the duration of the bonfire. For example, when the real object has a scent, the electronic device may determine the type and/or concentration of the scent (or smell) of the real object.

According to an embodiment, in operation 530, the electronic device may recognize a property of a virtual object in an augmented reality environment. For example, the property of the virtual object may include at least one of material, size, temperature, scent, type, state, and duration of the virtual object. For example, the electronic device may directly set the property of the virtual object or may receive data with regard to the property of the virtual object from an external electronic device (e.g., a server, database, and/or cloud). According to an embodiment, the property of the virtual object may be defined by a user input.

According to an embodiment, in operation 540, the electronic device may assign at least some of the transition property of the real object to the virtual object based on the transition property of the real object and the property of the virtual object. For example, the electronic device may set the temperature of the virtual object based on the temperature of the real object. For example, the electronic device may set the scent of the virtual object based on the scent of the real object. For example, the electronic device may determine the temperature (heat) and/or the concentration of scent to be assigned to the virtual object, based on the size or material of the real object, and/or the size, material (thermal conductivity according to the material), or duration (retention time) of the virtual object.

According to an embodiment, the electronic device may assign at least some of the property of the real object to the virtual object based on the distance between the real object and the virtual object in the augmented reality environment. For example, the electronic device may determine a value of a transition property to be assigned to the virtual object based on the distance between the real object and the virtual object. For example, the electronic device may determine an estimated temperature (heat) or an estimated scent (scent concentration) to be assigned to the virtual object based on the distance from the real object. According to an embodiment, the electronic device may determine a value of the transition property to be assigned to the virtual object based on a law (e.g., Graham's law of diffusion) or a formula (e.g., a heat transfer (conduction, convection, or radiation) formula) related to the transition property. For example, the electronic device may use existing laws or formulas related to transition property as they are, or may modify and use the laws or the formulas to be suitable for an augmented reality environment (or a virtual reality environment). For example, the electronic device may determine a value of a transition property to be assigned to a virtual object based on an equation defined by a user.

According to an embodiment, the electronic device may adjust a value of a property assigned to a virtual object over time. For example, the electronic device may adjust a value of a property assigned to the virtual object based on the duration of the real object or the virtual object. For example, when a real object has heat (temperature) or scent, the electronic device may adjust the temperature or the scent concentration of the virtual object according to the duration of the real object and the duration of the virtual object around the real object. For example, when a virtual object (e.g., an unscented handkerchief) is placed around a real object having a specific scent in the augmented reality environment, the scent (scent concentration) transferred to the virtual object may increase over time. For example, when a virtual object is disposed around a real object (e.g., fire) that generates heat in the augmented reality environment, the amount of heat (temperature) transferred to the virtual object may increase over time. As another example, when the virtual object moves away from the real object (i.e., when there is no transition property (e.g., temperature or scent) that transitions from the real object), the electronic device may decrease the value of the transition property assigned to the virtual object over time.

According to an embodiment, the electronic device may assign at least some of property assigned to a virtual object to other virtual objects. For example, when a first virtual object exists around a real object and a second virtual object exists around the first virtual object, the electronic device may assign at least some of the transition property of the real object to the first virtual object, and may assign at least some of the transition property (transition property provided from the real object) of the first virtual object to the second virtual object. According to an embodiment, when property (transition property) of the virtual object are predefined, the electronic device may cause at least some property to be transferred between virtual objects provided in the virtual reality environment as well as the augmented reality environment.

According to an operating method of an electronic device according to an embodiment, a realistic augmented reality environment or virtual reality may be provided by setting property related to tactile and olfactory senses for a virtual object in an augmented reality environment or virtual reality environment and transitioning property between objects.

Figure 6:
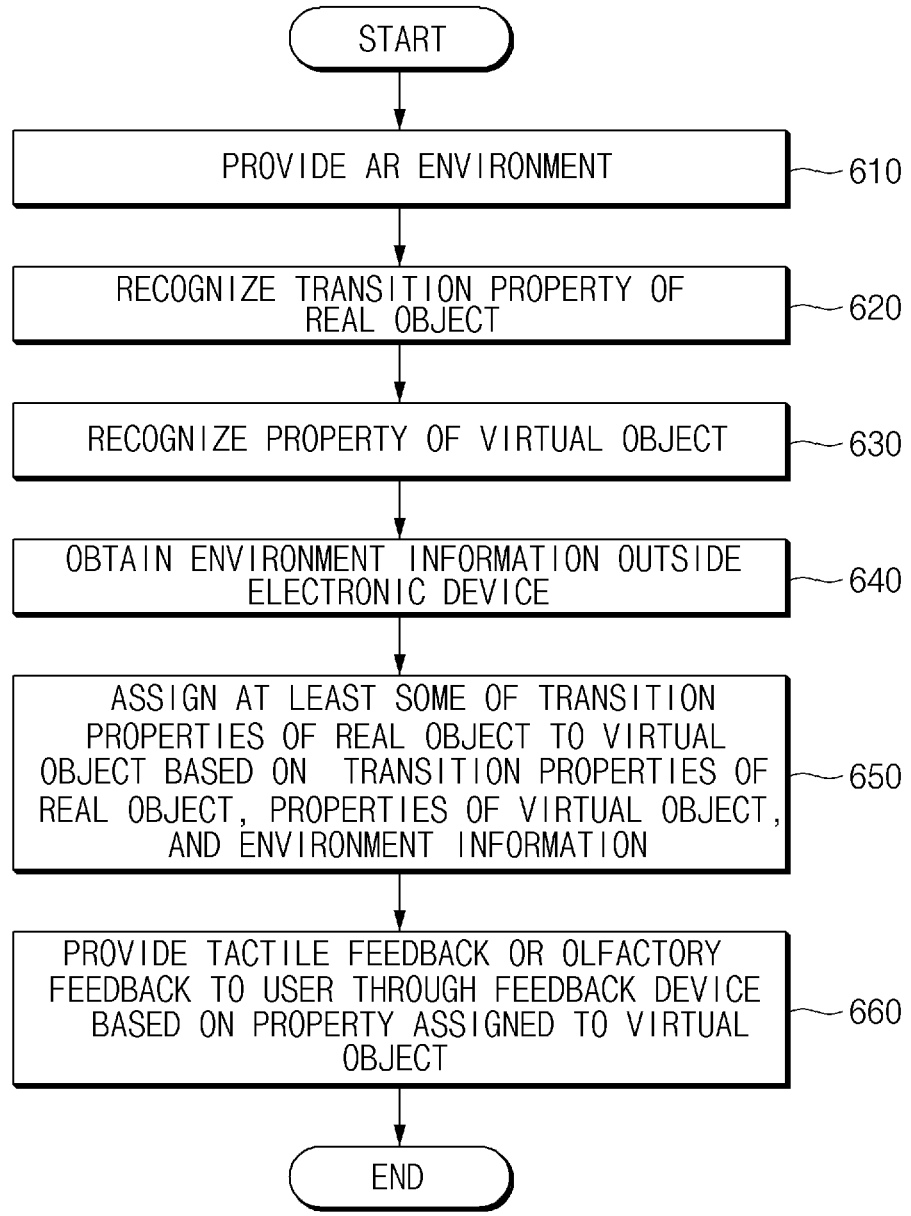
FIG. 6 is a flowchart of an operation method of an electronic device according to an embodiment.

FIG. 6 is a flowchart of an operation method of an electronic device according to an embodiment. Hereinafter, operations identical to or similar to those of FIG. 5 will be briefly described or omitted.

According to an embodiment, in operation 610, the electronic device (e.g., the electronic device 101 of FIG. 1, the electronic device 200 of FIG. 2, and the electronic devices 300a and 300b of FIGS. 3A and 3B) may provide an augmented reality (AR) environment.

According to an embodiment, in operation 620, the electronic device may recognize the transition property of the real object. For example, the electronic device may recognize the temperature or scent of a real object.

According to an embodiment, in operation 630, the electronic device may recognize a property of a virtual object in an augmented reality environment. For example, the electronic device may recognize at least one of material, size, temperature, scent, type, state, and duration of the virtual object.

According to an embodiment, in operation 640, the electronic device may obtain external environment information. For example, the external environment information may include at least one of wind direction, wind speed, external temperature, external humidity, or external weather. According to various embodiments, operation 640 may be performed before operation 620 or operation 630, or may be performed simultaneously with operation 620 and/or operation 630.

According to an embodiment, in operation 650, the electronic device may assign at least some of the transition property of the real object to the virtual object based on the transition property of the real object, the property of the virtual object, and external environment information. For example, the electronic device 200 may determine a value (e.g., a temperature and/or concentration of a scent to be assigned to the virtual object) that assigns the transition property (e.g., temperature or scent) of the real object to the virtual object, based on whether the wind blows from the real object direction to the virtual object direction or from the virtual object direction to the real object direction, or based on wind speed. For example, the electronic device may determine a value of a transition property (e.g., temperature or scent) assigned to a virtual object based on external temperature, humidity, or weather.

According to an embodiment, in operation 660, the electronic device may provide tactile feedback or olfactory feedback to the user through the feedback device based on the property assigned to the virtual object. For example, the feedback device may be a device configured to be worn on a part of the user's body (e.g., a glove, belt, garment, or shoe). For example, the feedback device may include a heating unit or an electrical output unit for providing the tactile feedback to the user, or may include a scent output unit for providing the olfactory feedback to the user. For example, the electronic device may transmit a property assigned to a virtual object and data (e.g., a temperature value, a scent concentration value, and/or a type of scent) related to the property or a control signal that causes a specific feedback to be performed to a feedback device. For example, the feedback device may output a feedback corresponding to property assigned to the virtual object based on data and/or signals received from the electronic device.

The operating method of the electronic device according to an embodiment may provide realistic and immersive augmented reality or virtual reality environments to the user by providing a feedback from various senses including not only a visual sense and an auditory sense but also an olfactory sense and a tactile sense, similar to a real world with respect to virtual objects in the augmented reality environment or virtual reality environment.

Figure 7:
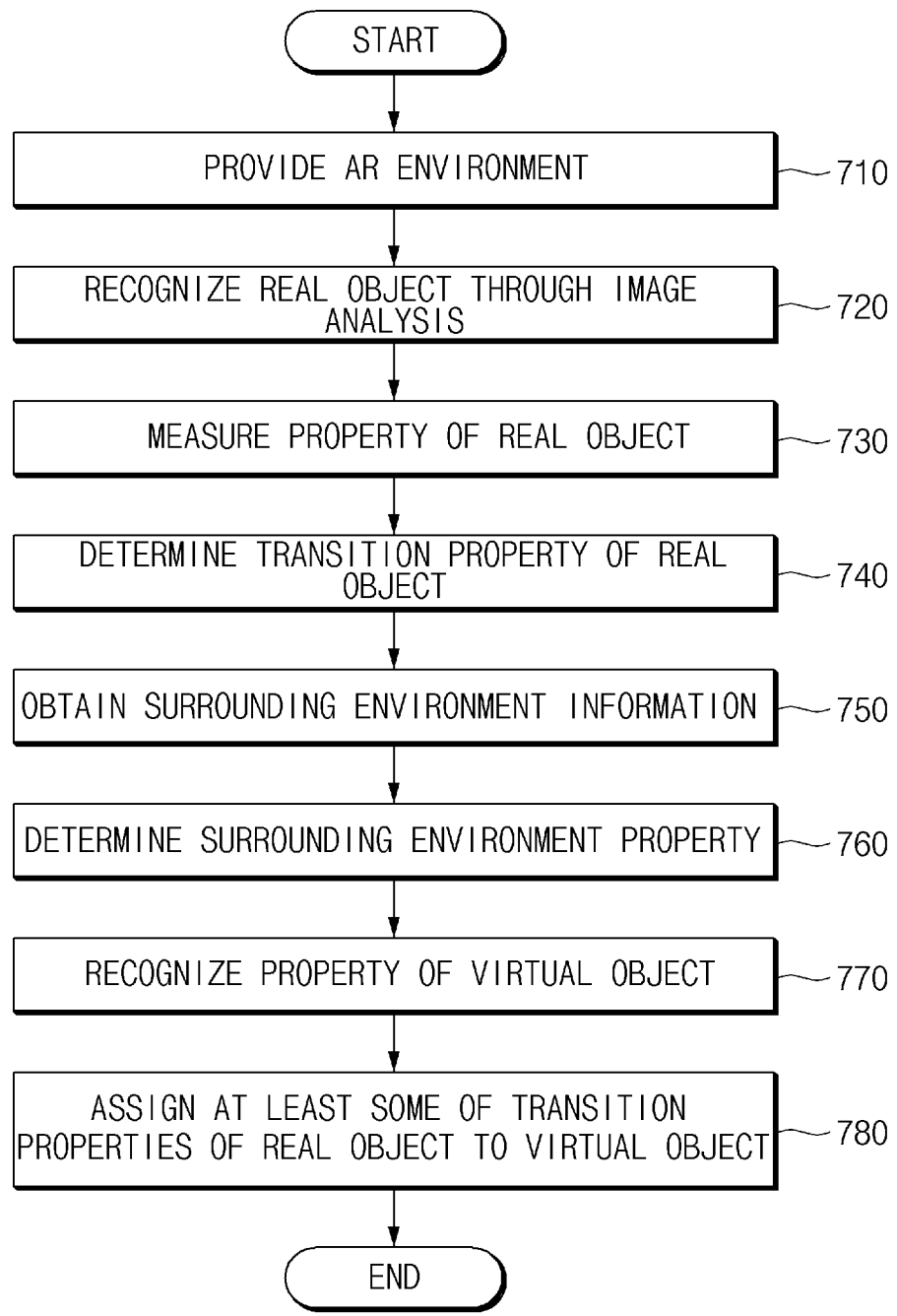
FIG. 7 is a flowchart of an operation method of an electronic device according to an embodiment.

FIG. 7 is a flowchart of an operation method of an electronic device according to an embodiment. Hereinafter, operations identical to or similar to those of FIG. 5 or 6 will be briefly described or omitted. For example, FIG. 7 describes an operation when a temperature property of a real object is assigned to a virtual object.

According to an embodiment, in operation 710, the electronic device (e.g., the electronic device 101 of FIG. 1, the electronic device 200 of FIG. 2, and the electronic devices 300a and 300b of FIGS. 3A and 3B) may provide the AR environment. For example, the electronic device may display both a virtual object and a real object through a display.

According to an embodiment, in operation 720, the electronic device may recognize a real object through image analysis. For example, the electronic device may obtain an image through a sensor and recognize a real object by analyzing the image.

According to an embodiment, in operation 730, the electronic device may measure the property of the real object. For example, the electronic device may recognize the type (e.g., person, boiling water, bonfire, etc.), size, and/or material of a real object. For example, when the real object is the bonfire, the electronic device may recognize that the real object is a fire, and may recognize the size of the bonfire and/or the material (e.g., coal) of the bonfire (raw material).

According to an embodiment, in operation 740, the electronic device may determine the transition property of the real object. For example, the electronic device may determine the temperature (heat), which is a transitional property of a bonfire. For example, when property values for a type (e.g., bonfire) of the real object are stored (defined) in advance, the electronic device may determine the transition property based on the property of the real object measured in operation 730.

According to an embodiment, in operation 750, the electronic device may obtain surrounding environment information. For example, the electronic device may recognize the direction or speed of the surrounding wind.

According to an embodiment, in operation 760, the electronic device may determine a surrounding environment property. For example, the electronic device may determine the surrounding environment property related to the transition property based on the surrounding environment information obtained in operation 750. For example, the electronic device may determine radiant heat or radiant speed at which heat is transferred based on wind direction or wind speed. For example, the electronic device may determine an estimated temperature (heat) at which the temperature (heat) of the real object is transferred to the surroundings, based on surrounding environment information.

According to an embodiment, in operation 770, the electronic device may recognize the property of the virtual object. For example, the electronic device may recognize the size, material, thermal conductivity, duration, and/or location (e.g., distance from the real object) of the virtual object.

According to an embodiment, in operation 780, the electronic device may assign at least some of the transition property of the real object to the virtual object based on the transition property of the real object, surrounding environment property, and property of the virtual object. For example, the electronic device may set the temperature of the virtual object (e.g., thermos bottle) based on the temperature (heat) of the real object (e.g., bonfire) and the determined surrounding environment property (e.g., radiant heat or radiation speed). For example, when the virtual object (e.g., thermos bottle) is placed around the real object (e.g., bonfire), the temperature of the thermos bottle may be set based on the bonfire's temperature, wind direction, wind speed, property (e.g., thermal conductivity, material, or size) set on the thermos bottle, the distance between the bonfire and the thermos bottle, and the duration during which the thermos bottle is placed around the bonfire.

Figure 8:
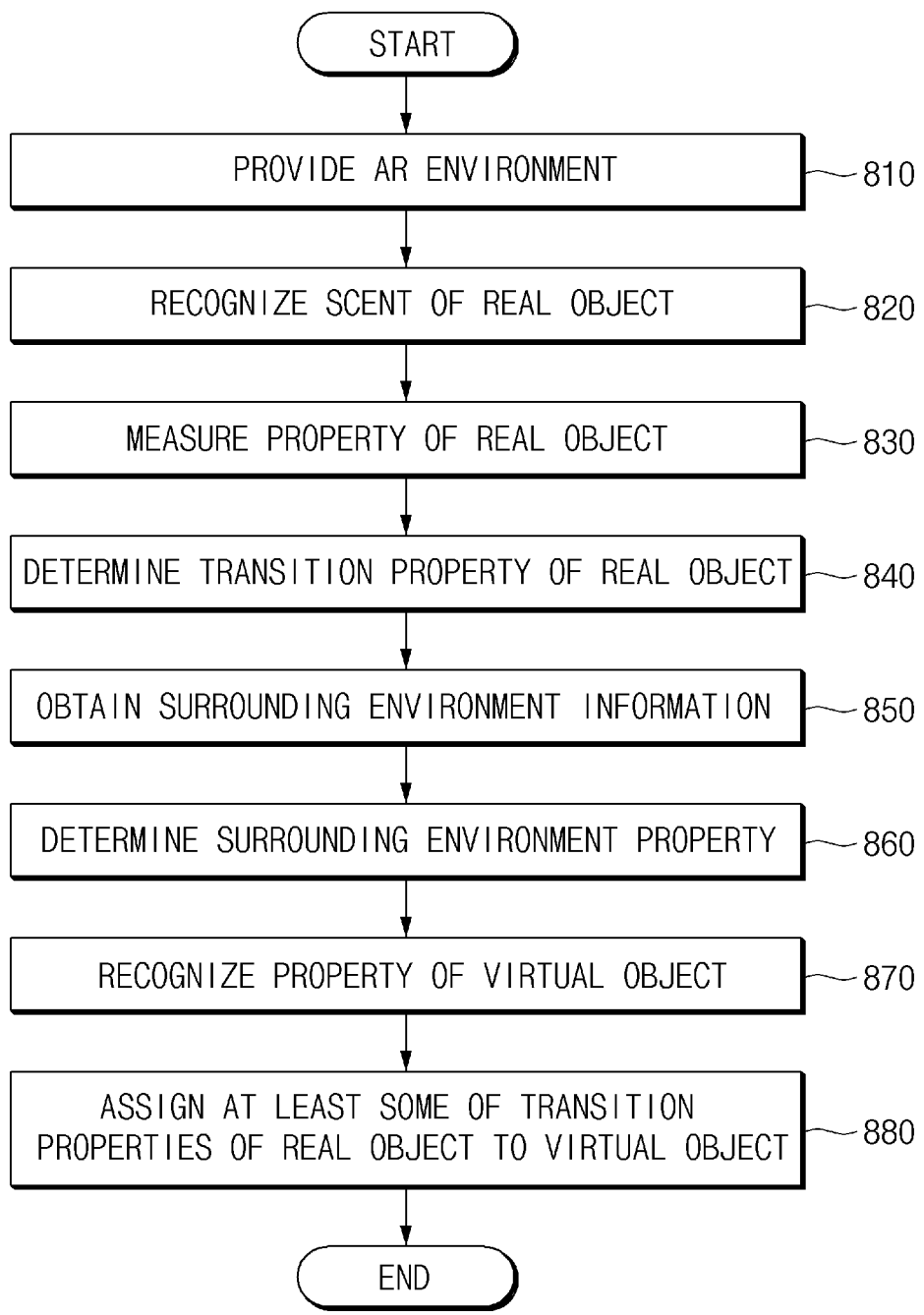
FIG. 8 is a flowchart of an operation method of an electronic device according to an embodiment.

FIG. 8 is a flowchart of an operation method of an electronic device according to an embodiment. Hereinafter, operations identical to or similar to those of FIG. 5 or 7 will be briefly described or omitted. For example, FIG. 8 describes an operation when a scent property of a real object is assigned to a virtual object.

According to an embodiment, in operation 810, the electronic device (e.g., the electronic device 101 of FIG. 1, the electronic device 200 of FIG. 2, and the electronic devices 300a and 300b of FIGS. 3A and 3B) may provide the AR environment.

According to an embodiment, in operation 820, the electronic device may recognize a scent or smell of a real object.

According to an embodiment, in operation 830, the electronic device may recognize the property of the real object. For example, the electronic device may measure the concentration of a scent or smell of a real object.

According to an embodiment, in operation 840, the electronic device may determine the transition property of the real object. For example, the electronic device may determine the type and concentration of a scent (or smell) of a real object. For example, the electronic device may determine, as the transition property, one of predefined scent values or concentration values for each object based on the measured scent or the measured concentration of the real object.

According to an embodiment, in operation 850, the electronic device may obtain surrounding environment information. For example, the electronic device may recognize the direction or speed of the surrounding wind.

According to an embodiment, in operation 860, the electronic device may determine a surrounding environment property. For example, the electronic device may determine the surrounding environment property related to the transition property based on the surrounding environment information obtained in operation 850. For example, the electronic device may determine the rate and degree at which the scent is transferred to the surroundings based on wind direction or wind speed. For example, the electronic device may determine an estimated concentration of the scent of a real object transferred to the surroundings based on surrounding environment information.

According to an embodiment, in operation 870, the electronic device may recognize the property of the virtual object. For example, the electronic device may recognize the size, material, thermal conductivity, duration, and/or location (e.g., distance from the real object) of the virtual object.

According to an embodiment, in operation 880, the electronic device may assign at least some of the transition property of the real object to the virtual object based on the transition property of the real object, surrounding environment property, and property of the virtual object. For example, the electronic device may set the scent of the virtual object (e.g., handkerchief) based on the scent (smell) of the real object (e.g., air freshener) and the determined surrounding environment property (e.g., degree/speed of transmission of the scent according to wind direction and wind speed). For example, when the virtual object (e.g. Handkerchief) is placed around a real object (e.g., air freshener), the scent and concentration of the handkerchief may be set based on the scent (e.g. specific scent or no scent) of the handkerchief, wind direction, wind speed, property (e.g. material, or size) set on the handkerchief, the distance between the air freshener and the handkerchief, and the duration during which the handkerchief is placed around the air freshener.

According to an embodiment, an operating method of an electronic device includes providing an augmented reality (AR) environment, recognizing transition property of a real object through the at least one sensor, recognizing property of a virtual object in the augmented reality environment, and assigning at least some of the transition property of the real object to the virtual object based on the transition property of the real object and the property of the virtual object.

According to an embodiment, the transition property of the real object may include a temperature or a scent of the real object.

According to an embodiment, the property of the virtual object may include at least one of a material, a size, a temperature, a scent, a type, a state, and a duration of the virtual object.

According to an embodiment, the assigning may include assigning at least some of property of the real object to the virtual object, based on a distance between the real object and the virtual object in the augmented reality environment.

According to an embodiment, the method may further include obtaining external environment information of the electronic device through the at least one sensor. According to an embodiment, the method may further include assigning at least some of the property of the real object to the virtual object, based on at least some of the external environment information.

According to an embodiment, the method may further include providing a tactile feedback or an olfactory feedback to a user through at least one feedback device configured to provide the tactile feedback or the olfactory feedback to the user based on the property assigned to the virtual object.

According to an embodiment, the method may further include adjusting a property value assigned to the virtual object over time.

According to an embodiment, the method may further include assigning at least some of the property assigned to the virtual object to another virtual object.

According to an embodiment, the method may further include storing at least one of information about the transition property of the real object and information about the property of the virtual object in at least one of the memory and an external database of the electronic device.

According to an embodiment disclosed in the disclosure, a recording medium storing computer-readable instructions comprising, when the instructions are executed by an electronic device, the instructions causing the electronic device to perform providing an augmented reality (AR) environment, recognizing transition property of a real object through the at least one sensor, recognizing property of a virtual object in the augmented reality environment, and assigning at least some of the transition property of the real object to the virtual object, based on the transition property of the real object and the property of the virtual object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
at least one sensor;
a communication circuitry;
memory; and
a processor coupled with the display, the at least one sensor, the communication circuitry, and the memory, and
wherein the memory comprises one or more instructions that, when executed, cause the processor to:
provide an augmented reality environment;
recognize a characteristic of a real object through the at least one sensor;
recognize a property of a virtual object in the augmented reality environment, wherein the virtual object is a different object than the real object, and wherein the property of the virtual object is associated with the characteristic of the real object; and
assign a partial measure of the characteristic of the real object to the virtual object based on the characteristic of the real object and the property of the virtual object.

2. The electronic device of claim 1, wherein the characteristic of the real object comprises at least one of a temperature of the real object or a scent of the real object.

3. The electronic device of claim 1, wherein the property of the virtual object comprises at least one of a material of the virtual object, a size of the virtual object, a temperature of the virtual object, a scent of the virtual object, a type of the virtual object, a state of the virtual object, and a duration of the virtual object.

4. The electronic device of claim 1, wherein
the partial measure of the characteristic of the real object that is assigned to the virtual object is based on a distance between the real object and the virtual object in the augmented reality environment.

5. The electronic device of claim 1, wherein the one or more instructions, when executed, further cause the processor to:
obtain external environment information of an external environment of the electronic device through the at least one sensor; and
assign the partial measure of the characteristic of the real object to the virtual object based on at least some of the external environment information.

6. The electronic device of claim 1, wherein the one or more instructions, when executed, further cause the processor to:
provide a tactile feedback or an olfactory feedback to a user through at least one feedback device configured to provide the tactile feedback or the olfactory feedback to the user based on the partial measure of the characteristic assigned to the virtual object.

7. The electronic device of claim 1, wherein the one or more instructions, when executed. further cause the processor to:
adjust a property value associated with the partial measure of the characteristic assigned to the virtual object over time.

8. The electronic device of claim 1, wherein the one or more instructions, when executed, further cause the processor to:
at least partially assign the partial measure of the characteristic assigned to the virtual object to another virtual object.

9. The electronic device of claim 1, wherein the one or more instructions, when executed, further cause the processor to:
store at least one of information about the characteristic of the real object and information about the property of the virtual object in at least one of the memory and an external database associated with the electronic device.

10. The electronic device of claim 1, wherein the at least one sensor includes at least one of a temperature sensor, an image sensor, an olfactory sensor, and one or more microphones.

11. A method of operating an electronic device, the method comprising:
providing an augmented reality environment;
recognizing a characteristic of a real object through at least one sensor;
recognizing a property of a virtual object in the augmented reality environment, wherein the virtual object is a different object than the real object, and wherein the property of the virtual object is associated with the characteristic of the real object; and
assigning a partial measure of the characteristic of the real object to the virtual object based on the characteristic of the real object and the property of the virtual object.

12. The method of claim 11, wherein the characteristic of the real object comprises at least one of a temperature of the real object or a scent of the real object.

13. The method of claim 11, wherein the property of the virtual object comprises at least one of a material of the virtual object, a size of the virtual object, a temperature of the virtual object, a scent of the virtual object, a type of the virtual object, a state of the virtual object, and a duration of the virtual object.

14. The method of claim 11, wherein the assigning comprises:
assigning the partial measure of the characteristic of the real object to the virtual object based on a distance between the real object and the virtual object in the augmented reality environment.

15. The method of claim 11, further comprising:
obtaining external environment information of an external environment of the electronic device through the at least one sensor, and
wherein the assigning comprises:
assigning the partial measure of the characteristic of the real object to the virtual object based on at least some of the external environment information.

16. The method of claim 11, further comprising:
providing a tactile feedback or an olfactory feedback to a user through at least one feedback device configured to provide the tactile feedback or the olfactory feedback to the user based on the partial measure of the characteristic assigned to the virtual object.

17. The method of claim 11, further comprising:
adjusting a property value associated with the partial measure of the characteristic assigned to the virtual object over time.

18. The method of claim 11, further comprising:
assigning, at least partially, the partial measure of the characteristic assigned to the virtual object to another virtual object.

19. The method of claim 11, further comprising:
storing at least one of information about the tr tycharacteristic of the real object and information about the property of the virtual object in at least one of the-a memory and an external database associated with the electronic device.

20. A non-transitory recording medium storing computer-readable instructions that, when executed by an electronic device, cause the electronic device to:
provide an augmented reality environment;
recognize a characteristic of a real object through at least one sensor;
recognize a property of a virtual object in the augmented reality environment, wherein the virtual object is a different object than the real object, and wherein the property of the virtual object is associated with the characteristic of the real object; and
assigning a partial measure of the characteristic of the real object to the virtual object based on the characteristic of the real object and the property of the virtual object.

* * * * *